United States Patent
Kasztenny

(10) Patent No.: US 8,441,768 B2
(45) Date of Patent: *May 14, 2013

(54) SYSTEMS AND METHODS FOR INDEPENDENT SELF-MONITORING

(75) Inventor: Bogdan Z. Kasztenny, Markham (CA)

(73) Assignee: Schweitzer Engineering Laboratories Inc, Pullman, WA (US)

(*) Notice: Subject to any disclaimer, the term of this patent is extended or adjusted under 35 U.S.C. 154(b) by 407 days.

This patent is subject to a terminal disclaimer.

(21) Appl. No.: 12/877,856

(22) Filed: Sep. 8, 2010

(65) Prior Publication Data

US 2012/0057266 A1   Mar. 8, 2012

(51) Int. Cl.
  *H02H 7/00* (2006.01)
(52) U.S. Cl.
  USPC .......................................... 361/93.2
(58) Field of Classification Search ............... 361/93.2
  See application file for complete search history.

(56) References Cited

U.S. PATENT DOCUMENTS

| | | | |
|---|---|---|---|
| 3,946,281 A | 3/1976 | Llona | |
| 4,296,475 A | 10/1981 | Nederlof | |
| 4,493,081 A | 1/1985 | Schmidt | |
| 4,506,362 A | 3/1985 | Morley | |
| 4,521,872 A | 6/1985 | Sawada | |
| 4,530,431 A | 7/1985 | Spurlin | |
| 4,534,031 A | 8/1985 | Jewer | |
| 4,672,501 A | 6/1987 | Bilac | |
| 4,769,735 A | 9/1988 | Ueda | |
| 4,812,995 A | 3/1989 | Girgis | |
| 5,083,036 A | 1/1992 | Beers | |
| 5,276,690 A | 1/1994 | Lee | |
| 5,497,322 A | 3/1996 | Kolomyski | |
| 5,533,195 A | 7/1996 | LaRochelle | |
| 5,555,250 A | 9/1996 | Walker | |

(Continued)

FOREIGN PATENT DOCUMENTS

| | | |
|---|---|---|
| JP | 59176939 | 10/1984 |
| JP | 59196698 | 11/1984 |
| JP | 2044921 | 2/1990 |
| WO | 03032159 | 4/2003 |

OTHER PUBLICATIONS

Nahmsuk Oh, Philip P. Shirvani, and Edward J. McCluskey, Technical Report—Center for Reliable Computing, Error Detection by Duplicated Instructions in Super-scalar Processors, Apr. 2005.

(Continued)

*Primary Examiner* — Stephen W Jackson
(74) *Attorney, Agent, or Firm* — Stoel Rives LLP

(57) ABSTRACT

An Intelligent Electronic Device (IED), such as a protective relay, may monitor and/or protect an electrical power system by detecting fault conditions using stimulus inputs from the electrical power system. The IED may operate (take protective actions) when fault conditions are detected. A monitoring device may supervise the IED. The monitoring device may detect power system disturbances independently of the IED, using the same stimulus inputs (or a subset thereof) used by the IED to implement its protection function(s). The monitoring device may supervise the IED using hard-coded supervision, soft-coded supervision, and/or user-configurable supervision. The IED may be prevented from operating outside of an operating window defined by the monitoring device. Components of the monitoring device may be separated and/or isolated from the IED, such that a failure in certain IED components may not cause a simultaneous failure or malfunction of the monitoring device.

21 Claims, 6 Drawing Sheets

U.S. PATENT DOCUMENTS

| | | | |
|---|---|---|---|
| 5,602,709 | A | 2/1997 | Al-Dabbagh |
| 5,627,716 | A | 5/1997 | Lagree |
| 5,742,513 | A | 4/1998 | Bouhenguel |
| 5,754,053 | A | 5/1998 | Bourdeau |
| 5,844,918 | A | 12/1998 | Kato |
| 5,847,913 | A | 12/1998 | Turner |
| 5,856,903 | A | 1/1999 | Smith |
| 5,872,722 | A | 2/1999 | Oravetz |
| 5,917,841 | A | 6/1999 | Kodama |
| 5,987,393 | A | 11/1999 | Stinson |
| 6,055,145 | A | 4/2000 | Lagree |
| 6,138,253 | A | 10/2000 | Buzsaki |
| 6,195,241 | B1 | 2/2001 | Brooks |
| 6,195,767 | B1 | 2/2001 | Adams |
| 6,292,911 | B1 | 9/2001 | Swanson |
| 6,397,355 | B1 | 5/2002 | Curtis |
| 6,414,829 | B1 | 7/2002 | Haun |
| 6,453,440 | B1 | 9/2002 | Cypher |
| 6,457,146 | B1 | 9/2002 | Keen |
| 6,473,880 | B1 | 10/2002 | Cypher |
| 6,477,682 | B2 | 11/2002 | Cypher |
| 6,594,774 | B1 | 7/2003 | Chapman |
| 6,615,376 | B1 | 9/2003 | Olin |
| 6,839,868 | B1 | 1/2005 | Pignol |
| 6,874,107 | B2 | 3/2005 | Lesea |
| 6,886,116 | B1 | 4/2005 | MacLellan |
| 6,970,037 | B2 | 11/2005 | Sakhuja |
| 6,973,613 | B2 | 12/2005 | Cypher |
| 6,983,414 | B1 | 1/2006 | Duschatko |
| 7,355,301 | B2 | 4/2008 | Ockert |
| 7,621,671 | B2 | 11/2009 | Petruzzi |
| 7,630,863 | B2 * | 12/2009 | Zweigle et al. ............... 702/188 |
| 2003/0033575 | A1 | 2/2003 | Richardson |
| 2003/0097628 | A1 | 5/2003 | Ngo |
| 2003/0156367 | A1 | 8/2003 | Macbeth |
| 2004/0153215 | A1 | 8/2004 | Kearney |
| 2005/0289407 | A1 | 12/2005 | Noda |
| 2005/0289442 | A1 | 12/2005 | Derner |
| 2006/0114627 | A1 | 6/2006 | Wong |
| 2006/0215335 | A1 | 9/2006 | Deshpande |
| 2007/0208981 | A1 | 9/2007 | Restrepo |
| 2007/0300121 | A1 | 12/2007 | Cooper |
| 2008/0080114 | A1 | 4/2008 | Schweitzer |
| 2008/0155293 | A1 | 6/2008 | Skendzic |
| 2008/0252631 | A1 | 10/2008 | Hori |
| 2008/0285623 | A1 | 11/2008 | Petruzzi |

OTHER PUBLICATIONS

Van Der Merwe, Cloete and Fischer, Implementation of an Unconventional Voltage Slide Scheme, Schweitzer Engineering Laboratories, Inc. Pullman, WA , Oct. 2004.

Wikipedia, Hamming Code http://en.wikipedia.org/wiki/Hamming_code, Jun. 12, 2006.

PCT/US2007/020385 Patent Cooperation Treaty, From the International Bureau, PCT Notification Concerning Transmittal of International Preliminary Report on Patentability , (Chapter 1 of Patent Cooperation Treaty), Date of Mailing Apr. 9, 2009, Applicant: Schweitzer Engineering Laboratories, Inc.

PCT/US2007/020408 Patent Cooperation Treaty, From the International Bureau, PCT Notification Concerning Transmittal of International Preliminary Report on Patentability, (Chapter 1 of Patent Cooperation Treaty), Date of Mailing Apr. 9, 2009, Applicant: Schweitzer Engineering Laboratories, Inc.

* cited by examiner

SYSTEMS AND METHODS FOR INDEPENDENT SELF-MONITORING

TECHNICAL FIELD

This disclosure relates generally to systems and methods for monitoring the operation of an intelligent electronic device (IED), such as a protective relay, to protect a power system while providing enhanced security.

BRIEF DESCRIPTION OF THE DRAWINGS

Non-limiting and non-exhaustive embodiments of the disclosure are described, including various embodiments of the disclosure with reference to the figures, in which.

Figure 1A:
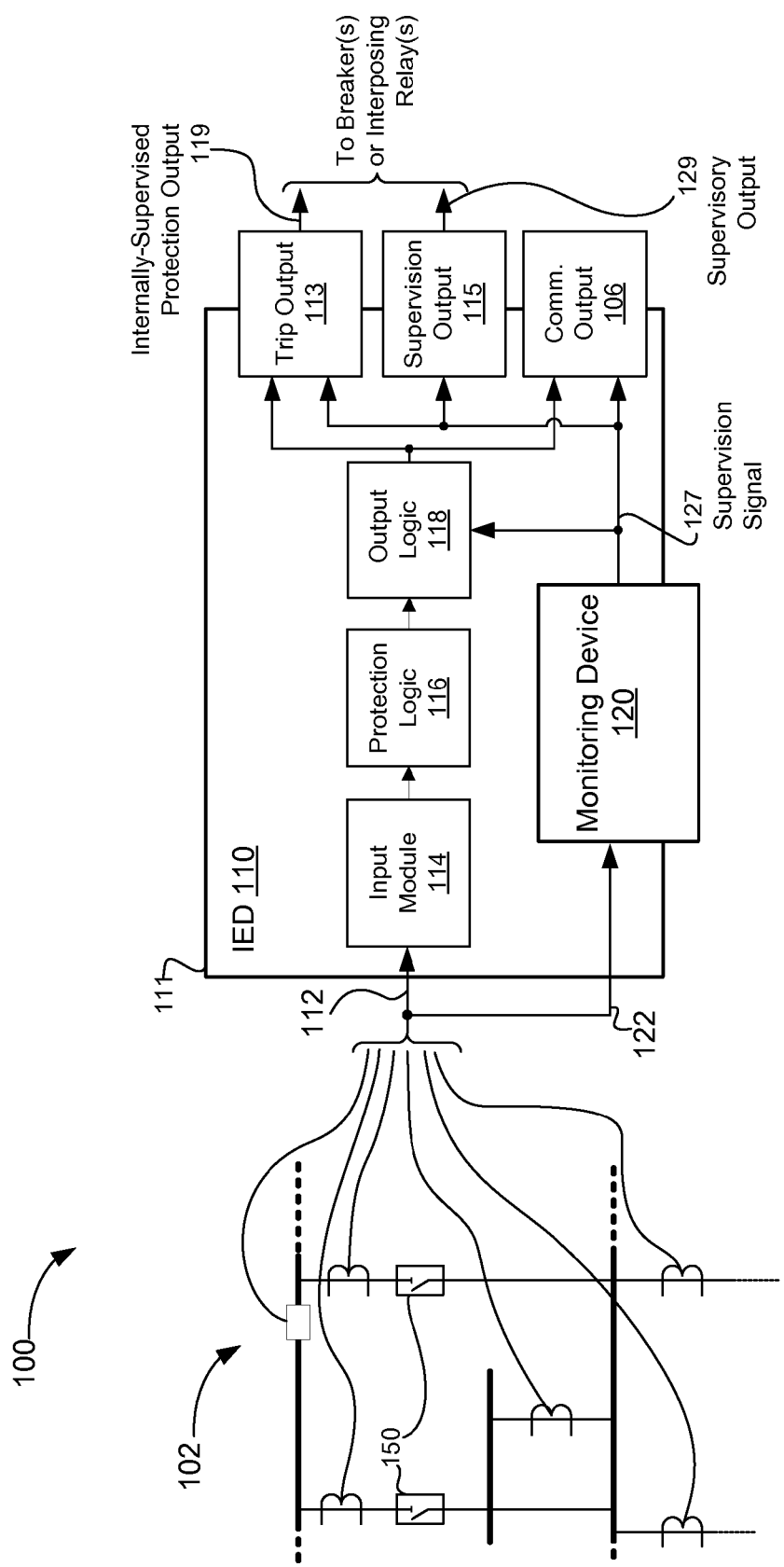
FIG. 1A depicts one embodiment of a system comprising an apparatus for independently supervising an IED.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

An IED, such as a protective relay, may monitor and protect an electrical power system in the event of power system faults. In response to detecting a fault condition, the IED may take one or more protective measures (e.g., trip breakers), which may cause service disruptions within the electrical power system, such as loss of power to the service area of the electrical power system, low-power conditions (e.g., brown out), increases in the burdens on other portions of the power system, and so on. Accordingly, the costs associated with misoperation of the IED (false tripping) may be significant.

As used herein, the term IED may refer to any device that monitors, controls, automates, and/or protects monitored equipment within the power system. Typically, such IEDs are implemented and/or comprise a computing device that includes a processor, memory, computer-readable non-transitory storage media, input/output interfaces, and the like. IEDs are, for example, differential relays, distance relays, directional relays, feeder relays, overcurrent relays, voltage regulator controls, voltage relays, breaker failure relays, generator relays, motor relays, automation controllers, remote terminal units, bay controllers, meters, recloser controls, communications processors, computing platforms, programmable logic controllers (PLCs), programmable automation controllers (PALs), input and output modules, and the like. The term IED may be used interchangeably to describe an individual IED or a system comprising multiple IEDs.

As illustrated above, some IEDs may be complex devices operating in an interconnected network. With the increasing complexity of IEDs comes an increased risk of misoperation. It has been observed that IED misoperation may occur for any number of reasons including, but not limited to: failures in IED componentery, such as processor(s), memory, computer-readable media, electrical interconnects, communication interfaces, and the like; failures in electrical components, such as operational amplifiers, analog-to-digital converters (ADCs), capacitors, inductors, and the like; soft errors due to software and/or firmware faults, compiler errors, processor errors, and the like; and so on.

Some IEDs may incorporate self-testing and/or self-validation components, such as processor watchdogs, to help prevent misoperation. However, these components are subject to failure just as the other components of the IED. Moreover, since the monitoring devices are typically incorporated into the IED, a failure within the IED may also cause a failure in the monitoring component(s). In another approach, an electrical power system may be monitored by two redundant IEDs, the outputs of which may be cross-validated to ensure that both are operating properly. This configuration, however, may increase the likelihood of IED failure since the combination results in a device that is roughly twice as complex as a single IED (the failure rate may be approximately double that of a single IED). Moreover, since a failure in either IED may cause a self-test alarm and take the IEDs out of service, availability is likely to be significantly reduced.

In some embodiments, the operation of an IED may be supervised by a monitoring device. The monitoring device may perform a relatively simple monitoring function configured to prevent misoperation of the IED. Accordingly, the monitoring device may be implemented using a relatively small number of components, which may reduce the likelihood of its failure. Moreover, in some embodiments, the monitoring device may be implemented independently of the IED, such that the monitoring device may be insulated from failures within the IED. The monitoring device may be configured to supervise the IED by, for example, supervising a protection function of the IED (e.g., a differential protection element) and/or supervising one or more IED tripping outputs (e.g., an interposing electromechanical relay).

The monitoring device may be configured to supervise the IED by detecting "disturbances" in the electrical power system. When a disturbance is detected, the monitoring device may enable IED operation (e.g., tripping), and when no disturbance is detected, the monitoring device may inhibit IED operation. The monitoring device may detect electrical power system disturbances using stimulus inputs corresponding to the stimulus used by the IED to protect the power system. Disturbance detection may comprise the monitoring device determining the rate of change (delta) in the stimulus inputs, and detecting a disturbance when the delta exceeds a threshold. Responsive to detecting a disturbance, the monitoring device may open an "operating window," during which the IED may be allowed to operate (e.g., trip).

FIG. 1A depicts one example of a system 100 comprising a monitoring device to monitor an IED. As depicted in FIG. 1A, the IED 110 may comprise an input module 114 to receive a set of stimulus inputs 112 from the electrical power system 102. The stimulus inputs 112 may comprise measurements of currents flowing within the electrical power system 102, voltages at various points within the electrical power system 102, or the like.

The IED 110 may detect faults (or other failure conditions) within the electrical power system 102 based upon the stimulus inputs 112. In response to detecting a fault condition, the IED 110 may take one or more protective actions, which may include, but are not limited to: tripping one or more breakers or switches, asserting one or more alarms, initiating other relays and/or any other protective action known in the art. In some embodiments, the IED 110 may control one or more breakers 150 (or other protective devices) within the electrical power system 102. The IED 110 may detect power system fault conditions and/or control the breakers 150 using the protection logic 116, which may be implemented using a processor (not shown).

As used herein, the term processor may refer to any processing means known in the art including, but not limited to: a general-purpose microprocessor, a special-purpose microprocessor (e.g., digital signal processor (DSP)), a Field Programmable Gate Array (FPGA), a programmable logic array (PLA), programmable logic (PL), a PLC, an Application Specific Integrated Circuit (ASIC), analog circuitry, or the like.

As described above, the protective actions taken by the IED 110 may interrupt service to users of the electrical power system 102 (adversely impact availability of the power system 102). In addition, the protective actions may increase the burden on other portions of the electrical power system 102. As such, there may be significant consequences for misoperation of the IED 110.

The system 100 may comprise a monitoring device 120 configured to monitor and/or supervise the IED 110. In some embodiments, the monitoring device 120 may be isolated and/or separate from the IED 110 (e.g., the monitoring device 120 may be a separate device, housed in a separate housing). Alternatively, the monitoring device 120 may be implemented in conjunction with the IED 110 (e.g., may be a component of the IED 110 or the like) and, as such, may share certain components with the IED 110. For example, the monitoring device 120 may be housed within an enclosure 111 of the IED 110, may share certain components with the IED 110, such as a power supply (not shown), measurement devices (not shown), and so on. The shared components may be selected as components of the IED 110 that are less likely to fail relative to other IED 110 components, such as the protection logic 116.

IEDs are expected to operate during events that inherently are power system disturbances, which may be detected using a disturbance detection mechanism of the monitoring device 120. Therefore, if the IED 110 is to operate, it is to do so during a disturbance (or within a predetermined time window of detecting a disturbance); if the IED 110 is attempting to operate in the absence of a disturbance (or outside of a predetermined operating window after detecting a disturbance), the IED 110 is likely misoperating and should be prevented from taking the one or more protective actions. In some embodiments, the monitoring device 120 may be configured to prevent the IED 110 from operating (e.g., tripping breakers 150) outside of the disturbance detection operating window.

The monitoring device 120 may receive stimulus inputs 122, which may comprise the same set of stimulus inputs 112 (or subset thereof) used by the IED 110 to provide the protective function(s) described above. The monitoring device 120 may detect disturbances in the electrical power system 102 based on the stimulus inputs 122. Detecting a disturbance may comprise the monitoring device 120 calculating a delta of one or more composite values derived from the stimulus inputs 122 and comparing the delta to a threshold. A disturbance may be detected when the delta exceeds the threshold.

In some embodiments, the monitoring device 120 may be configured to calculate one or more composite values from the stimulus inputs 122. For example, if the stimulus inputs 122 comprise current measurements of each phase of a three-phase system (e.g., measurements of the A, B, and C phases), the composite value ($X_{Comp}$) may be calculated as follows:

$$X_{Comp} = I_A - 0.5 \cdot I_B - 0.5 \cdot I_C \qquad \text{Eq. 1}$$

A similar technique may be used to calculate a composite value from voltage or other stimulus inputs. Although certain techniques for calculating a composite value are taught herein, the disclosure is not limited in this regard, and may be adapted to use any technique for combining stimulus inputs known in the art. The technique(s) used to calculate composite values may be configured such that the composite values are non-zero during normal power system operating conditions. In some embodiments, the monitoring device 120 may calculate composite value(s) using analog circuitry and/or a processor. In other embodiments, the composite value(s) may be generated using a measurement device, such as the interposing current transformer (CT) 341 of the IED 310 described below in conjunction with FIG. 3.

In some embodiments, the monitoring device 120 may calculate composite values comprising different three-phase current and/or voltage inputs. For example, a composite value may comprise each phase of a plurality of different three-phase current inputs per Equation 2:

$$X_{Comp} = \Sigma_{i=1}^{n} w_i (I_{i,A} - 0.5 I_{i,B} - 0.5 I_{i,C}) \qquad \text{Eq. 2}$$

In Equation 2, i denotes the set of three-phase current and/or voltage inputs. Each set of three-phase current measurements may be weighted by a respective weighting factor $w_i$, which may be configured to maintain the composite value $X_{comp}$ of Equation 2 in a non-zero state under nominal operating conditions and/or to ensure that different sets will not cancel each other.

The monitoring device may calculate a respective delta (rate of change) for each composite value. In embodiments in which the stimulus inputs 122 comprise periodic measurements obtained according to a measurement and/or monitoring cycle (e.g., measurements every 1 millisecond), the delta of a measurement cycle k (Dx(k)) may be calculated as follows:

$$Dx(k) = |X_{Comp}(k) - X_{Comp}(k-n)| \qquad \text{Eq. 3}$$

In Equation 3, $X_{Comp}(k)$ may represent a composite value from a measurement and/or monitoring cycle and $X_{Comp}(k-n)$ may represent a composite value from a previous cycle. In some embodiments, n may be selected to be a multiple of a power cycle. In embodiments in which the stimulus inputs 122 are obtained continuously, the delta may be calculated by sampling the continuous measurements at a particular sampling frequency and using Equation 3 above.

The deltas of each of the one or more composite values may be compared to respective thresholds. When any of the deltas exceed its respective threshold, a disturbance may be detected. In some embodiments, the thresholds may be constant values selected according to testing and/or experience. Alternatively, the thresholds may be adaptive. The adaptive thresholds may comprise an approximation of a noise level (e.g., standing noise) in the stimulus inputs, in the corresponding composite value and/or in the corresponding delta. For example, the monitoring device 120 may establish an adaptive threshold for a particular composite value delta using a two-point infinite impulse response (IIR) filter as follows:

$$TH(k)=a \cdot Dx(k)+(1-a) \cdot TH(k-1) \quad \text{Eq. 4}$$

In Equation 4, the adaptive threshold TH(k) for a particular measurement and/or monitoring cycle may be calculated using the delta Dx(k) and the adaptive threshold of a previous cycle TH(k−1). The constant values a may be selected according to testing and/or experience (e.g., may be a small positive value, below 1).

The adaptive threshold value calculated per Equation 4 (or other noise approximation technique) may be scaled by a scaling factor for comparison with the corresponding delta. The scaling factor may be selected according to testing and/or experience. Typical scaling factors range between 2 and 3. In some embodiments, the monitoring device 120 may apply minimum and/or maximum limits to the adaptive threshold. The limits may be proportional to the magnitude of the stimulus inputs 122, the composite values, observed deltas, or the like (e.g., selected by testing and/or experience).

The monitoring device may detect a disturbance in the electrical power system 102 when a delta Dx(k) of any one of the composite values exceeds its respective threshold, per Equation 6:

$$DD(k)=Dx(k)>p \cdot TH(k) \quad \text{Eq. 6}$$

In Equation 6, DD(k) represents disturbance detection for the k measurement and/or monitoring cycle, and p represents the scaling factor of the adaptive threshold TH(k). As illustrated in Equation 6, DD(k) is non-zero or "true" when Dx(k) exceeds the scaled adaptive threshold.

The monitoring device 120 may be configured to monitor and/or supervise the IED 110 according to the disturbance detection mechanism described above. The monitoring device 120 may be configured to open an "operating window" responsive to detecting a disturbance in the electrical power system 102. The operating window may "open" when the monitoring device 120 detects a disturbance and may remain open for a predetermined time thereafter (e.g., predetermined time period, number of measurement cycles, number of monitoring cycles, or the like). Opening the operating window may comprise the monitoring device 120 asserting a supervision signal 127, which, as described below, may be configured to allow the IED 110 to take one or more protective actions within the electrical power system 102 (e.g., trip relays, operate breakers, communicate trip comments, and so on). The monitoring device 120 may be configured to prevent the IED 110 from taking the one or more protective actions outside of the "operating window" (e.g., when the monitoring device 120 has not detected a disturbance in the electrical power system 102). The duration of the operating window may be selected according to testing and/or experience.

The monitoring device 120 may be configured to supervise the IED 110 using hard-coded supervision, soft-coded supervision, user-programmable supervision, or the like. Hard-coded supervision may comprise the monitoring device 120 being electrically coupled the IED 110. Soft-coded and/or user-programmable supervision may comprise the output logic 118 (and/or protection logic 116) of the IED 110 using the supervision signal 127 to logically supervise the trip output 113 (e.g., using output forming logic implemented using a processor, FPGA, or the like).

In some embodiments, the IED 110 may include a trip output 113, which may comprise a relay, a solid-state output (e.g., transistor), or the like. The IED 110 may operate the trip output 113 using a driver (or other control signal) generated by the output logic 118 (or protection logic 116). The monitoring device 120 may supervise the IED 110 by inhibiting the trip output 113 outside of the operating window (e.g., the IED 110 may be prevented from operating the trip output 113 outside of the operating window). Hard-coded supervision may comprise electrically coupling the supervision signal 127 (or supervisory output 129) to the trip output 113. Soft-coded supervision may comprise the IED 110 using the supervision signal 127 (or supervisory output 129) in its protection function (e.g., in the protection logic 116 and/or output logic 118). For example, the output logic 118 may include logic to inhibit the trip output 113 when the supervision signal 127 is not asserted. The manner in which the supervision signal 127 and/or supervisory output 129 is used to supervise the IED 110 may be user configurable. For example, the IED 110 may be configured to take protective actions (assert the trip output 113) only if the supervision signal 127 is asserted (e.g., when the operating window is open), to ignore the supervision signal 127, or the like. In some embodiments, a user may configure the IED 110 increase its sensitivity when the supervision signal 127 is asserted and to decrease its sensitivity otherwise. Similarly, the IED 110 may delay operation according to the supervision signal 127 (e.g., may operate instantaneously within the operating window or after a predetermined time delay otherwise). However, certain failures in the IED 110 may cause misoperation regardless of the state of the supervision signal 127 and, as such, supervision at this point within the IED 110 may not be completely reliable.

In some embodiments the IED 110 and/or monitoring device 120 may comprise a supervision output 115, which may generate a supervisory output 129. The supervisory output 129 may be used to supervise the IED 110 as described above. Examples of various supervision techniques are described below in conjunction with FIGS. 1B-1D.

In some embodiments, the monitoring device 120 and/or IED 110 may be communicatively coupled to external IEDs (not shown), monitoring stations, and/or human-machine interfaces via a communication interface 106. In some embodiments, the IED 110 may send trip commands to the IEDs (or other protective devices) via the communication interface 106. The monitoring device 120 and/or IED 110 may transmit messages comprising the internally-supervised trip output 119, supervisory output 129, and the like. Transmitting the supervisory output 129 (and/or supervising the trip output 113 as described above) may inhibit operation of the external IEDs outside of the operating window. One or more alerts may be generated and/or transmitted via the communication interface 106 when an inconsistency between the IED 110 and the monitoring device 120 is detected (e.g., when the IED 110 attempts to trip outside of the operating window).

Figure 1B:
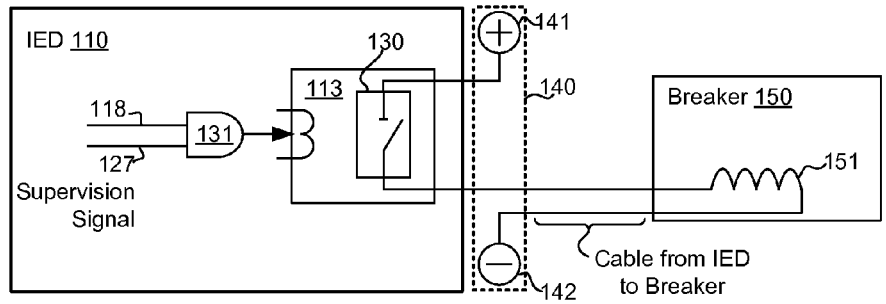
FIG. 1B depicts one embodiment of a supervised IED trip output.

FIG. 1B depicts one embodiment of a supervised trip output. In the FIG. 1B example, the trip output 113 of the IED 110 comprises a relay 130 (e.g., an electromechanical relay). In other embodiments, a solid-state output generating device (e.g., transistor) or other output generating mechanism could be used. The trip output may be controlled by a trip signal of the output logic 118 and the supervision signal 127 (generated by the monitoring device 120). The supervision may comprise AND logic 131, which may prevent the output logic 118 from operating the relay 130 when the supervision signal 127 is not asserted. The AND logic 131 may be hard-coded using electrical components (e.g., AND gate logic 131) and/or or soft-coded using processing components (e.g., a processor, FPGA, or the like of the output logic 118). The relay 131 may be coupled to a source, which, in the FIG. 1B example, may comprise a battery 140 having positive 141 and negative 142 terminals. When the relay 130 operates, the battery 140 may drive the tripping coils 151, which may cause the breaker 150 to operate.

Figure 1C:
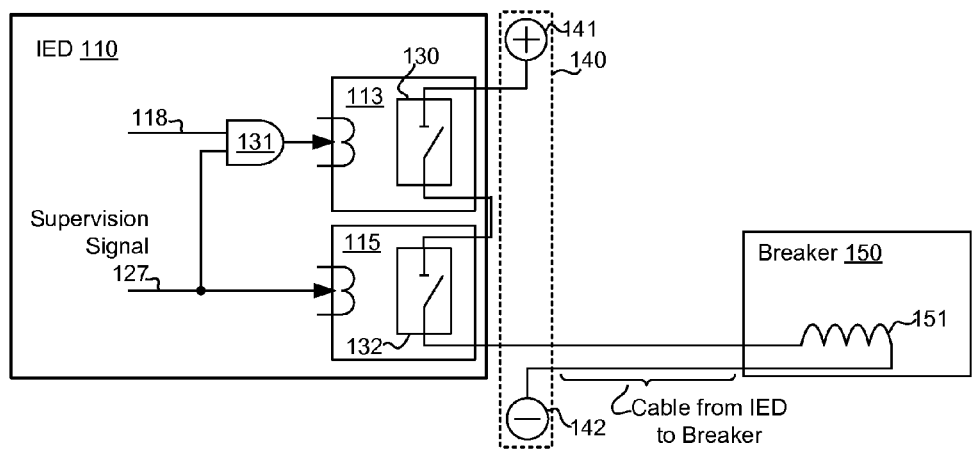
FIG. 1C depicts another embodiment of a supervised IED trip output.

FIG. 1C depicts another embodiment of a supervised trip output. FIG. 1C includes a supervision output 115 comprising a relay 132, which is electrically connected in series with the relay 130 of the trip output 113. The series connection may provide additional protection against a failure in the trip output 113 (e.g., failure in the relay 130, or the like). As described above, the relay 130 (or other output generating device) may operate using a combination of the IED 118 output logic and supervision signal 127. A relay 132 of the supervision output 115 may be connected in series with the relay 130. The relay 132 may be controlled by the supervision signal 127. Accordingly, in order for the trip output to operate the breaker 150 (e.g., energize the trip coils 151), both the relay 130 and 132 must be closed. Therefore, a failure in the trip output 113 (or the supervision output 115) may not cause misoperation of the breaker 150. In some embodiments, the supervision output 115, including the relay 132, may be isolated from the IED 110 and trip output 113 (e.g., the supervision output 115 may be implemented on a separate printed circuit board (PCB), may be housed in a separate, isolated enclosure, or the like). The isolation may prevent the supervision output 115 from being affected by failures in the IED 110 and/or trip output 113.

Figure 1D:
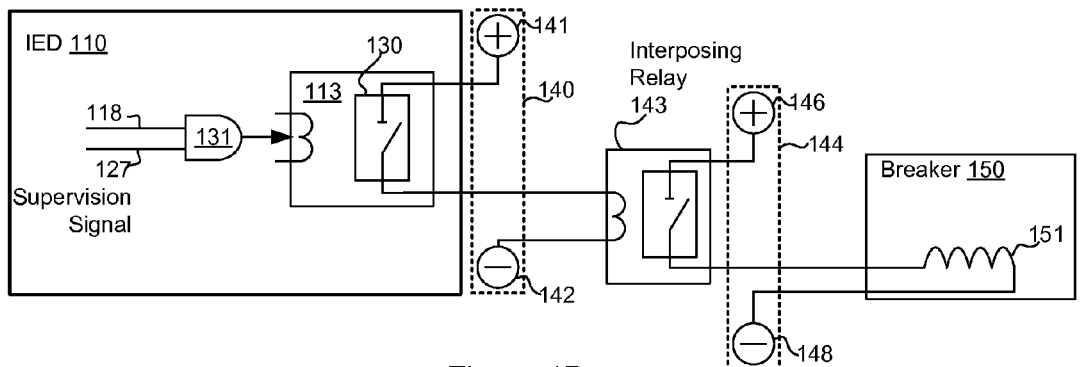
FIG. 1D depicts another embodiment of a supervised IED trip output.

FIG. 1D depicts another embodiment of a supervised trip output. In some embodiments, the relays 130 and/or 132 may not be rated to operate the breaker 150. For example, the breaker 150 may require 30 amps to close with a sustained 6-10 amp carry, which the trip output 113 and/or supervision output 115 may not be rated to provide. Accordingly, in some embodiments and as shown in FIG. 1D, the trip output 113 may be electrically coupled to an interposing relay 143 (and battery source 144, with positive and negative terminals 146 and 148), which may be rated to operate the breaker 150. Although FIG. 1D shows the trip output 113 operating the interposing relay 143; an interposing relay could be used with trip output of FIG. 1C. Moreover, in some embodiments, the trip output 113 and/or supervision output 115 may be coupled to multiple interposing relays to operate a plurality of breakers (e.g., contact multiplication).

Figure 2:
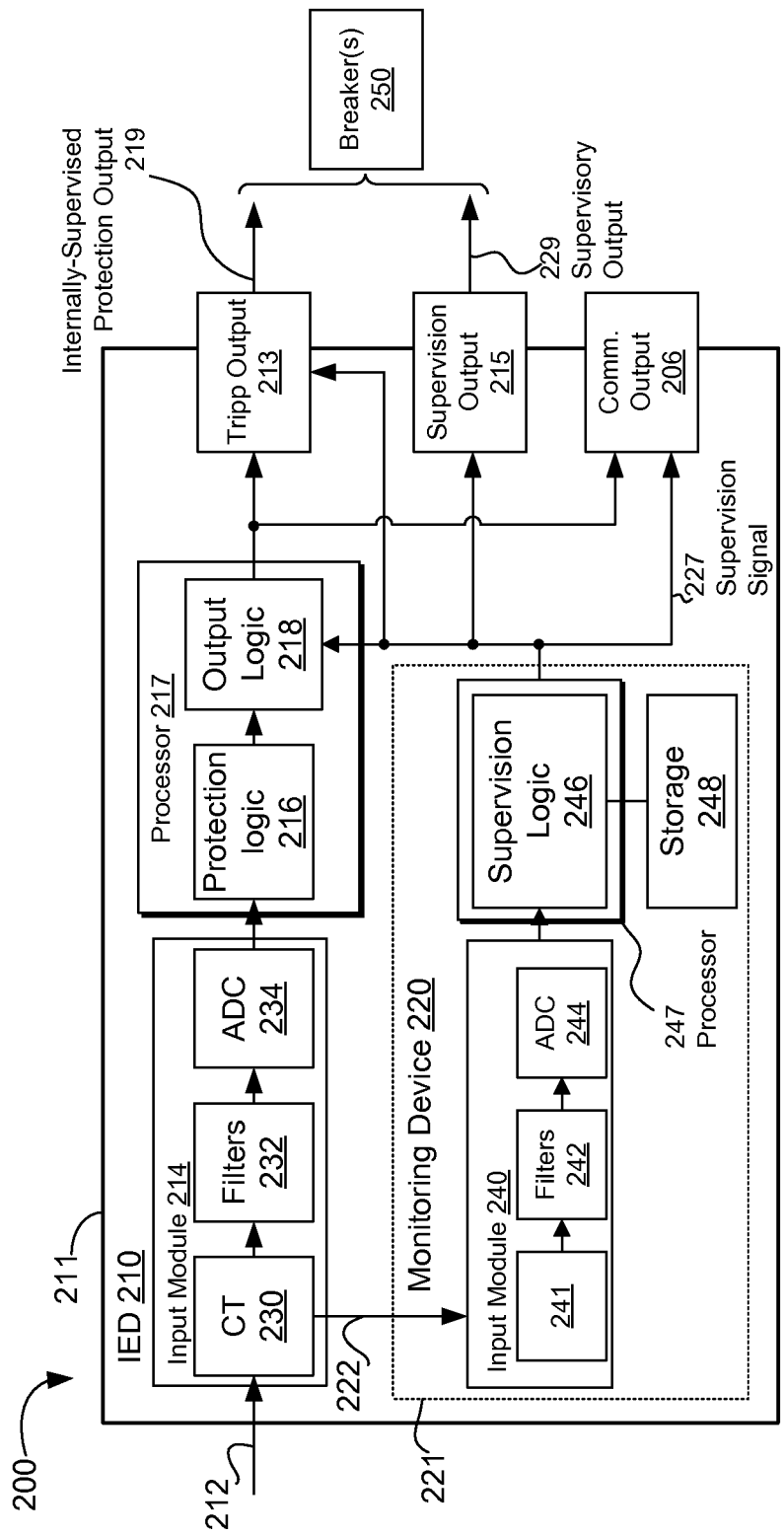
FIG. 2 is a functional block diagram of one embodiment of a monitoring device.
Figure 3:
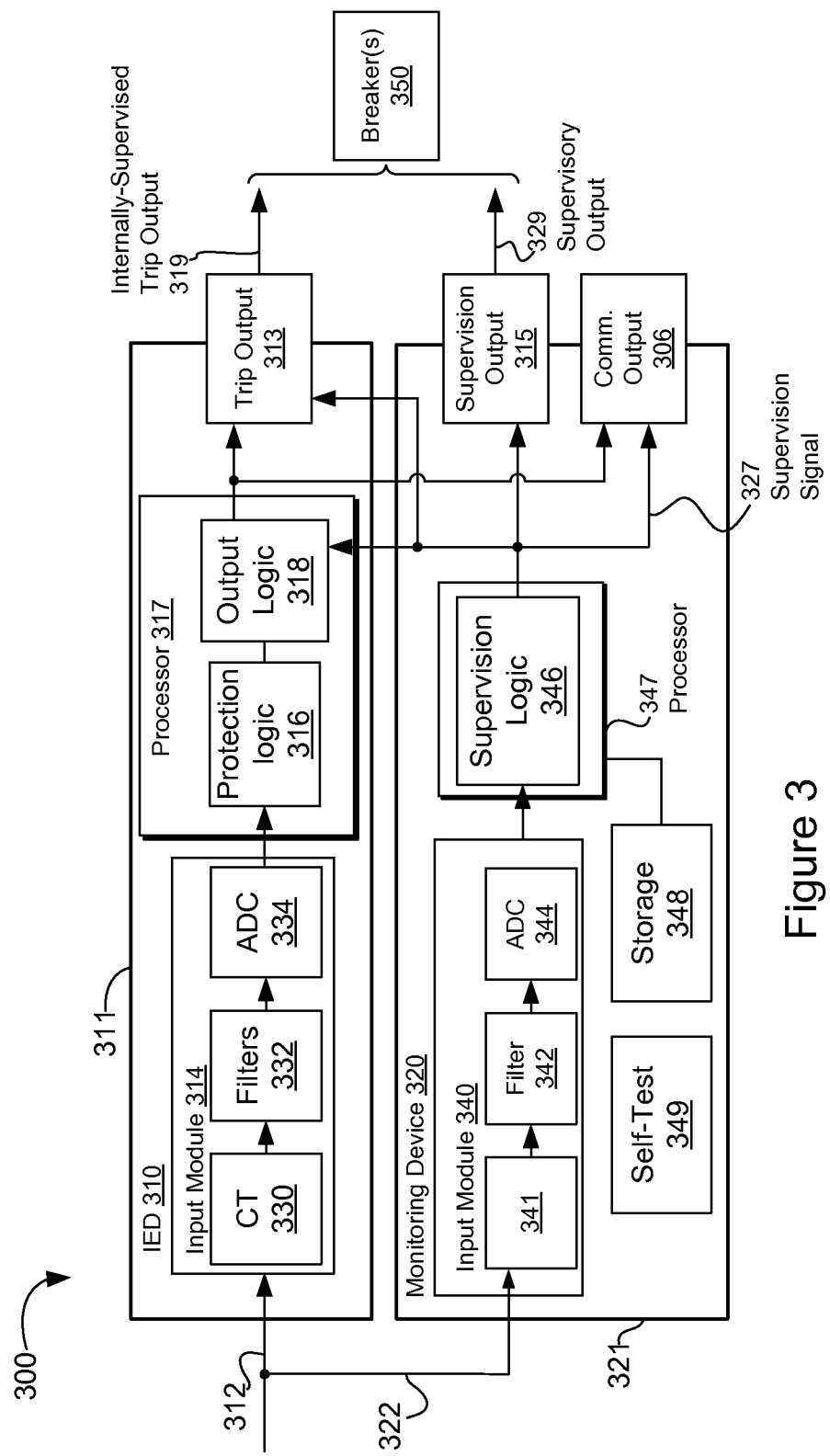
FIG. 3 is a functional block diagram of another embodiment of a monitoring device.

FIG. 2 is a functional block diagram 200 of one embodiment of an IED 210 comprising an independent monitoring device 220. In some embodiments, the monitoring device 220 may be housed within an enclosure 211 of an IED 210 and/or may share a power supply (not shown) with the IED 210. Alternatively, and as shown in FIG. 3, a monitoring device may be disposed in its own, separate housing.

The monitoring device 220 may be implemented using components that are separate and/or isolated from other components of the IED 210. In some embodiments, components of the monitoring device 220, such as the input module 240, supervision logic 246, storage 248, and the like may be implemented on a dedicated element 221 of the IED 210. For example, the element 221 may comprise a separate expansion board (e.g., PCB or other module) within the IED 210, and may be independent of and/or isolated from other components of the IED 210, such as the filters 232, ADCs 234, protection logic 216, and so on, such that a failure or other fault therein may not cause a failure in the monitoring device 220. In some embodiments, the element 221 may be galvanically isolated and/or shielded from other components of the IED 210, may have a separate and/or independent connection to ground, may comprise a separate and/or backup power supply, or the like.

The IED 210 may receive stimulus inputs 212 at an input module 214, which may comprise one or more measurement devices (e.g., interposing CTs 230), filters 232, ADCs 234, and/or other measurement devices to receive, measure, and/or sample the stimulus inputs 212. The monitoring device 220 may receive stimulus inputs 222, which may be derived from the stimulus inputs 212 of the IED 210. In some embodiments, the stimulus inputs 222 may be taken from measurement devices of the IED 210. For example, the stimulus inputs 222 may comprise electrical connections to burden resistors (not shown) of the CTs 230. Accordingly, a "monitoring-zone" of the monitoring device 220 may begin at the CTs 230 and include the balance of the IED 210 (depending on how monitoring device 220 is configured to supervise the IED 210).

The IED 210 may comprise protection logic 216 to detect fault conditions within an electrical power system and take corresponding protective actions (e.g., using breakers 250). The protection logic 216 and/or output logic 218 may be implemented using a processor 217 (or separate processors (not shown)).

The monitoring device 220 may be configured to prevent misoperation of the IED 210. The stimulus inputs 222 of the monitoring device 220 may be received at an input module 240, which may comprise a composite value module 241 to combine the stimulus inputs 222 into one or more composite values as described above. The input module 240 may comprise filters 242 and ADCs 244, which may operate independently of the filters 232 and/or ADC 234 of the IED 210 (e.g., may be separate and/or isolated from the IED 210 and/or components thereof).

The monitoring device 220 may comprise supervision logic 246, which may be configured to implement the disturbance detection-based supervision described above. The supervision logic 246 may be implemented using a dedicated processor 247. As used herein, a "dedicated processor" may refer to a processor that performs a limited or predefined set of tasks (or a single task). For example, the dedicated processor 247 of the monitoring device 220 may be dedicated to supervising the IED 210 (e.g., performing disturbance detection and managing the supervision output 224). Accordingly, the dedicated processor 247 may be a relatively simple processor running a relatively small or limited set of computer- and/or machine-readable instructions, which may reduce the likelihood of a failure within the monitoring device 220. In some embodiments, the dedicated processor 247 may be used as an ADC 244, to implement the supervision logic 246, and to generate the supervision signal 227. The dedicated processor 247 may be independent of and/or isolated from the processor 217 of the IED 210.

Portions of the supervision logic 246 may be implemented using computer- and/or machine-readable instructions stored on a non-transitory storage 248, which may comprise a disk, optical media, non-volatile memory, solid-state memory (e.g., Flash memory), an EEPROM, or the like. The supervision logic 246 processor (and related components) may be implemented using components that are independent of and/or isolated from other components of the IED 210; the supervision logic 246 may be implemented using a dedicated processor 247 and/or storage 248 that is independent of and/or isolated from the processor 217 used to implement the protection logic 216 and/or output logic 218 of the IED 210. Accordingly, a failure in the processor 217 (or other components of the IED 210) may not affect the monitoring device 220.

The supervision logic 246 may be configured to calculate deltas of the filtered and digitized composite values produced by the input module 240, calculate an adaptive threshold for each delta, and compare the deltas to the respective adaptive thresholds as described above. The supervision logic 246 may, therefore, comprise and/or be communicatively coupled to a storage 248 to store previous values of the composite value delta(s), adaptive threshold(s), instructions, and the like. Instructions for implementing portions of the supervision logic 246 may be stored on the storage 248. The storage 248 may be separate from and/or independent of storage resources of the IED 210 (not shown). The storage 248 may be provided by the processing means used to implement the supervision logic 246 (e.g., storage registers, cache memory, or the like). Alternatively, or in addition, the storage 248 may comprise a separate storage device, such as disc storage, non-volatile memory storage (e.g., Flash memory), EEPROM memory storage, or the like.

The supervision logic 246 may be configured to assert the supervision signal 227 (and/or generate the supervisory output 229) responsive to detecting a disturbance in the electrical power system, which may be used to supervise the IED 210 (supervise the trip output 213). As described above in conjunction with FIGS. 1A-1D, the monitoring device 220 may be configured to supervise the IED 210 using one or more of hard-coded supervision, soft-coded supervision, user configurable supervision, a combination of supervision mechanisms, or the like. The internally-supervised protection output 219 and/or the supervisory output 229 may control one or more breakers 250 (and/or interposing relays) as described above.

In some embodiments, the monitoring device 220 may be configured to detect internal failure conditions (e.g., perform one or more self-test operations), such as invalid inputs (e.g., a composite value of zero (of within a threshold of zero)), failures in the supervision logic 246, processor 247, storage 248, or the like. The monitoring device 220 may be prevented from supervising the IED 210 when a failure condition is detected (e.g., when a failure condition is detected, the monitoring device 220 may assert the supervisory output 229). Alternatively, or in addition, the monitoring device 220 may produce a failure output (not shown), which may be used to void or waive supervision of the IED 210 allowing the latter to operate without the supervision. The failure output may be communicated to the protection logic 216, the output logic 218, and/or the trip output 213. For example, the trip output 213 may be hard-coded to ignore the supervisory output 229 when the failure output is asserted (e.g., allow the protection output 219 to assert regardless of the state of the supervisory output 229 using analog components, digital logic components, soft-coding, or the like). In addition, the monitoring device 220 may generate an alert indicative of the failure, which may be communicated via the communication interface 206, displayed on a human-machine interface (not shown), communicated to the IED 210, or the like. Alternatively, or in addition, the monitoring device 220 may generate a "keep-alive" output (via the supervisory output 229 or other output signal (not shown), such as a solid-state output, serial communication, or the like), which may be monitored by the IED 210. When the IED 210 fails to receive the keep-alive output, the IED 210 may disable supervision by the monitoring device 220 as described above.

In some embodiments, the internally-supervised trip output 219, the supervisory output 229, and/or other signals (e.g., inconsistency alerts, keep-alive messages, etc.) may be communicated on a communication interface 206 to one or more IED(s), monitoring stations, human-machine interfaces, or the like as described above.

The IED 210 and/or monitoring device 220 may be configured to generate an alert when the IED 210 attempts to operate (e.g., assert the protection output 219) outside of the operating window of the monitoring device 220. The alert may be displayed on an interface (not shown) of the IED 210 and/or monitoring device 220, via the communication interface 206, or the like.

FIG. 3 is a functional block diagram 300 of another embodiment of a monitoring device 320. The monitoring device 320 of FIG. 3 may be implemented such that it is substantially independent of and/or isolated from the IED 310. Accordingly, substantially all of the components of the IED 310 (314, 316, 317, 318, 330, 332, and 334) may be within the "monitoring zone" of the monitoring device 320 (depending upon the technique used to supervise the IED 310).

The IED 310 may receive stimulus inputs 312 which, as described above, may comprise current and/or voltage measurements of an electrical power system (not shown). A plurality of the stimulus inputs 312 received at the input module 314 may be received at the input 322 to the monitoring device 320. The monitoring device 320 may obtain the stimulus inputs 322 independently of the input module 314 of the IED 310. In one example, the monitoring device 320 may comprise one or more separate and/or independent measurements devices (e.g., CTs 341), which may receive the stimulus inputs 322. In some embodiments, one or more of the CT(s) 341 may be summing CTs comprising windings configured to generate composite signals from two or more of the stimulus inputs 322. For example, a CT 341 may comprise windings in an orientation and/or configuration to combine and/or scale a plurality of inputs 322 to yield a composite signal according to Equations 1 and/or 2 above. Other measurement devices configured to combining stimulus inputs could be used including, but not limited to: summing transformers, summators (e.g., op-amps tapping the burden resistors of CTs 341), or the like.

The input module 340 may comprise separate and/or independent filters 342, ADCs 344, and the like. The supervision logic 346 may use the filtered and digitized composite values to supervise the IED 310 as described above. The supervision may comprise detecting disturbances in the electrical power system and, responsive to detecting a power system disturbance, opening an operating window using the supervision signal 327 and/or supervisory output 329.

The supervision logic 346 (and/or the ADC 344) may be implemented using a processor 347 which may be independent of and/or isolated from the processor 317 of the IED 310. The processor 347 may be dedicated to the supervision of the IED 310 and, as such, may be configured to perform a limited set of operations (e.g., implement the ADC 344 and/or the supervision logic 346). The supervision logic 346 may comprise and/or be communicatively coupled to storage 348 to store previous values of the composite value delta(s), adaptive threshold(s), instructions, and the like.

As illustrated in FIG. 3, the monitoring device 320 may be implemented within a separate, isolated enclosure 321. Accordingly, in some embodiments, the monitoring device 320 may comprise a separate and independent power supply (not shown), ground connection (not shown), shielding, and the like. Alternatively, the monitoring device 320 may be implemented in conjunction with the IED 310 as illustrated in FIG. 2 (e.g., within an enclosure 311 of the IED 310 and/or sharing one or more components of the IED 310).

As discussed above, the "monitoring-zone" provided by the monitoring device 320 may be defined according to the degree of separation and/or isolation between the monitoring device 320 and the IED 310. In the FIG. 3 example, the monitoring zone may comprise the entirety of the IED 310 from the input module 314 to the output logic 318 (depending on the configuration of the supervision).

The monitoring device 320 may supervise the IED 310 using hard-coded supervision, soft-coded supervision, and/or user-configurable supervision as described above in conjunction with FIGS. 1A-1D. Accordingly, the monitoring device 320 may generate a supervision signal 327 and/or supervisory output 329 (using the supervision output 315), which may supervise the trip output 313 to generate the internally-supervised trip output 319. Alternatively, or in addition, the supervision signal 327 may flow to the IED 310, which may implement soft-coded and/or user-configurable supervision. The internally-supervised protection output 319 and/or the supervisory output 329 may control one or more breakers 350 (and/or interposing relays) as described above.

The IED 310 and/or monitoring device 320 may be configured to generate an alert when the IED 310 attempts to operate (e.g., assert the protection output 319) outside of the operating window of the monitoring device 320. The alert may be displayed on an interface (not shown) of the IED 310 and/or monitoring device 320, may be transmitted on the communication interface 306, or the like. The monitoring device 320 may further comprise a self-test module 349, which may be configured to perform one or more self-test operations to detect errors and/or failure conditions in the monitoring device 320, including, but not limited to: invalid stimulus inputs (e.g., zero or near-zero composite value, faults in the input module 340, etc.), errors in the supervision logic 346, including the storage 348 and/or processor 347 (e.g., processor watch dog, resource monitoring, etc.), firmware or software corruption (e.g., using a cyclic redundancy check (CRC) or the like), failures in the input module 340, and so on. The self-test module 349 may be configured to prevent supervision when a failure condition is detected using the supervision signal 327, a "keep alive" signal (not shown), as described above. The self-test module 349 may be implemented as a dedicated component of the monitoring device 320 using a separate components, a separate processor (not shown), and/or as a module running on the processor 347.

In some embodiments, the internally-supervised trip output 319, the supervisory output 329, and/or other signals (e.g., inconsistency alerts, keep-alive messages, etc.) may be communicated on a communication interface 306 to one or more IED(s), monitoring stations, human-machine interfaces, or the like as described above.

Figure 4:
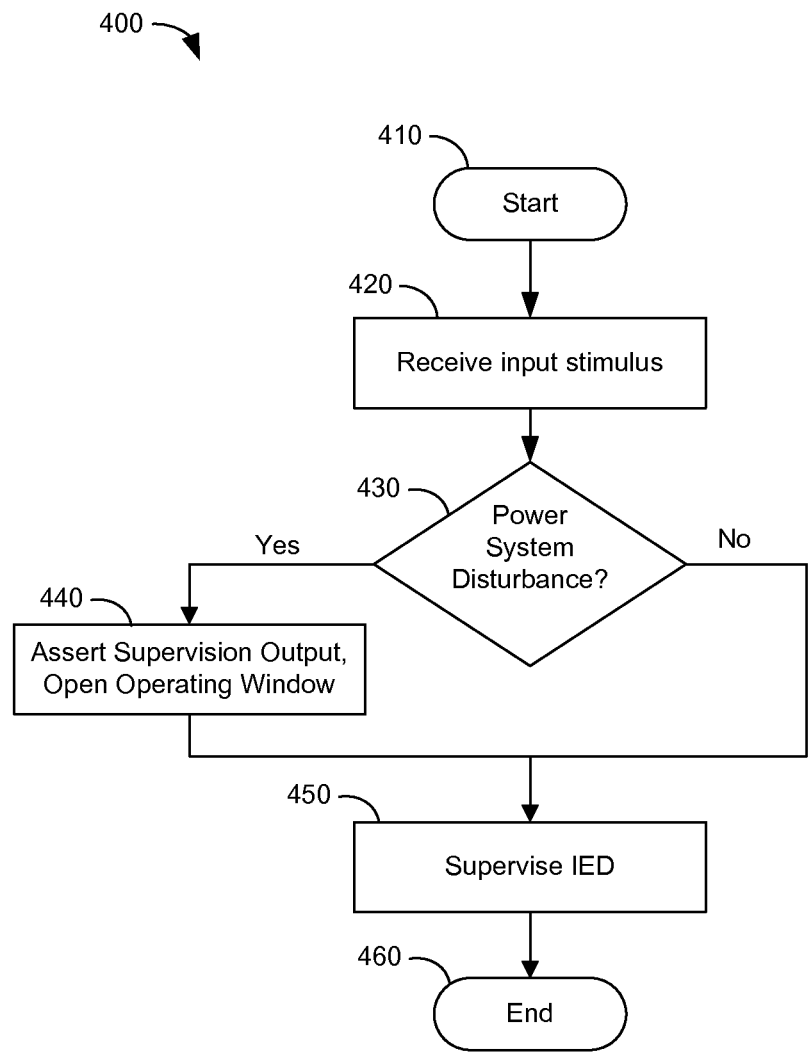
FIG. 4 is a flow diagram of one embodiment of a method for independent self-monitoring.

FIG. 4 is a flow diagram of one embodiment of a method 400 for independent self-monitoring. The method 400 may be embodied as one or more computer- and/or machine-readable instructions stored on a non-transitory storage medium, such as a disk, optical media, non-volatile memory, solid-state memory (e.g., Flash memory), EEPROM, or the like. Steps of the method 400 may be implemented using machine components, such as measurement devices (e.g., current transformers, etc.), processing means (e.g., processors, ASICs, FPGAs, etc.), and the like. Accordingly, steps of the method 400 may be tied to a particular machine and/or to particular machine components.

At step 410, the method 400 may start and be initialized. Step 410 may comprise loading one or more machine-readable instructions from a storage medium, initializing machine resources, and the like.

At step 420, stimulus inputs may be received. The stimulus inputs may comprise current and/or voltage measurements of an electrical power system and may correspond to one or more stimulus inputs used by an IED to protect the electrical power system. The stimulus inputs may comprise the same set of stimulus inputs used by the IED, or a subset thereof. The stimulus inputs may have been acquired from the electrical power system using one or more current transformers, voltage measurement devices, or the like. The stimulus inputs of step 420 may comprise phasor measurements, accordingly each the stimulus inputs may comprise magnitude and a phase components, measurements of each phase of a three-phase signal, or the like.

At step 430, the method 400 may determine whether the stimulus inputs are indicative of a disturbance in the electrical power system. In some embodiments, step 430 may comprise calculating a delta of the stimulus inputs (and/or a delta of a composite value comprising a plurality of the stimulus inputs), comparing each delta to a respective threshold, and detecting a disturbance when any of the deltas exceeds its respective threshold. When a disturbance in the electrical power system is detected at step 430, the flow may continue to step 440; otherwise, the flow may continue to step 450.

At step 440, the method 400 may assert a supervision output, open an operating window, and/or generate some other indicia of the disturbance detection. Opening an operating window at step 440 may comprise maintaining an output (or other indicia) in an asserted state for a predetermined time, predetermined number of measurement cycles, predetermined number of monitoring cycles, or the like.

At step 450, the method 400 may supervise the operation of an IED. Supervising the IED may comprise preventing the IED from operating and/or asserting a trip output (e.g., output 119, 219, and/or 319), unless the supervision signal of step 440 is asserted, or the "operating window" of step 440 is open. The supervision of step 450 may comprise hard-coded supervision, soft-coded supervision, user-configurable supervision, or the like as described above. Accordingly, step 450 may be implemented using hardware components of the IED, a hardware or electrical coupling, or the like. Use of hardware components to supervise the IED may limit the exposure of the supervision (e.g., the method 400) to the failure condition(s). However, soft-coded and/or user configurable supervision may use processing resources of the IED, which may expose the supervision the IED failure conditions (e.g., a failure in the IED output forming logic may affect soft-coded supervision).

At step 460, the method 400 may terminate until a next set of stimulus inputs are received, at which point the flow may continue at step 420.

Figure 5:
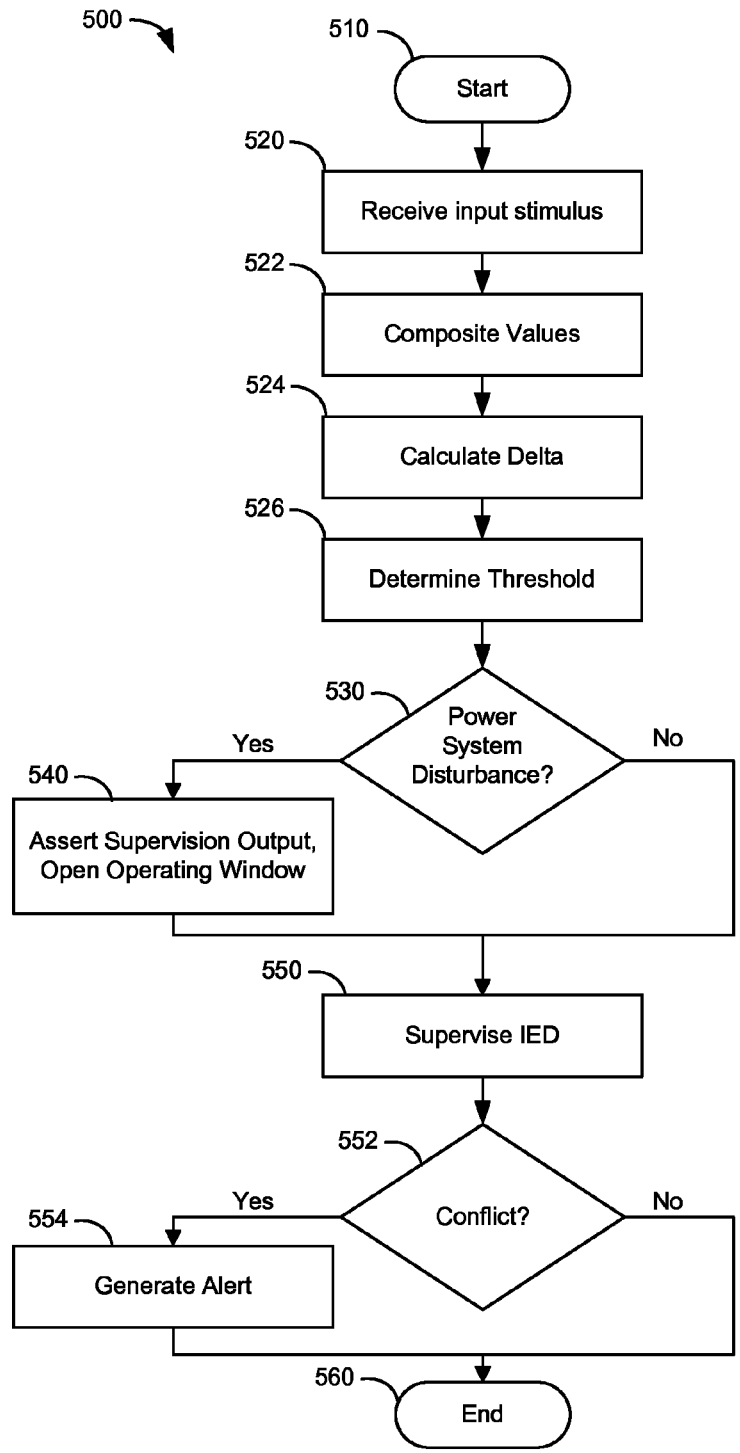
FIG. 5 is a flow diagram of another embodiment of a method for independent self-monitoring.

FIG. 5 is a flow diagram of another embodiment of a method 500 for supervising an IED. As described above, the method 500 may be implemented using computer- and/or machine-readable instructions stored on a non-transitory storage medium, and some of the steps of the method 500 may be tied to a particular machine and/or machine components.

At step 510, the method 500 may start and be initialized as described above. At step 520, a set of stimulus inputs related to an electrical power system may be received as described above. The stimulus inputs may correspond to one or more of the stimulus inputs used by the IED to monitor and/or protect the electrical power system.

At step 522, the stimulus inputs may be combined into one or more composite values. In some embodiments, the composite values may comprise a three-to-one compression of stimulus inputs; a composite value may be formed from each phase of a three-phase signal. The composite values may be calculated according to Equations 1 and/or 2 described above. Calculating the composite values may comprise filtering the composite values using one or more analog filters and/or sampling the values using an ADC.

In some embodiments, the composite values may be calculated using a measurement device and/or analog circuitry, such as a summing CT, a summator (e.g., one or more op-amps tapping the burden resistors of one or more CTs), or any other device capable of measuring and/or combining a input stimulus. In some embodiments, the "primary windings" of a window-type CT, such as a PCB mounted CT, may be configured to combine a plurality of input stimulus signals into a single composite value according to Equations 1 and/or 2 (two turns for phase A, and one turn for each B and C in the opposite directions).

At step 524, the method 500 may calculate a delta (e.g., rate of change) for each of the composite values calculated at step 522. The delta of a composite value may be calculated according to Equation 3 above (as the difference between the present composite value and a previous composite value). Alternatively, the delta may be calculated by approximating a cycle-to-cycle difference of a composite value.

At step 526, an adaptive threshold of each delta may be calculated. The adaptive threshold may correspond to a noise level of the stimulus inputs and/or delta values (e.g., standing noise level). In some embodiments, the adaptive threshold may be calculated using an IIR filter (e.g., 2-point IIR filter) per Equation 4 above. However, other techniques for calculating an adaptive threshold and/or estimating noise may be used under the teachings of this disclosure. Step 526 may comprise applying upper and lower bounds to the adaptive thresholds. The upper and/or lower bounds may be proportional to the magnitude of the stimulus inputs (e.g., within 1% of the input magnitudes), proportional to an expected delta, set by testing and/or experience, or the like.

At step 530, the method 500 may determine whether the stimulus inputs of step 520 are indicative of a disturbance in the electrical power system. Step 530 may comprise detecting a disturbance if any of the delta values exceeds its respective adaptive threshold per Equation 6 above. The adaptive threshold may be scaled by a scaling factor which, as discussed above, may be set between 2 and 3 by testing and/or experience.

If a disturbance is detected at step 530, the flow may continue to step 540; otherwise, the flow may continue to 550. In some embodiments, step 530 may further comprise performing and/or evaluating the results of one or more self-test operations to determine whether the method 500 is operating properly. For example, step 530 may determine whether any of the composite values is zero (or within a threshold of zero), whether machine-readable instructions implementing the method 500 have been corrupted (e.g., using a CRC check), or the like. Alternatively, or in addition, the self-testing of step 530 may comprise transmitting periodic keep-alive messages to the IED. The IED may disable supervision when a keep-alive message is not received within a predetermined time. If the self-monitoring indicates a failure condition, the method 500 may be prevented from supervising the IED, and the flow may continue to step 540 to open the operating window regardless of the results of the adaptive threshold comparison(s) above. Alternatively, or in addition, the method 500 may assert a failure output and/or may generate one or more alerts regarding the self-test failure.

At step 540, the method 500 may assert a supervision output and/or open an operating window as described above. At step 550, the method 500 may supervise operation of the IED as described above.

At step 552, the method 500 may determine whether the disturbance detection of step 530 conflicts with a trip output of the IED. A conflict may be detected when the IED attempts to operate (e.g., assert a trip output) when the supervision signal is not asserted and/or when the operating window is not open. If a conflict is detected, the flow may continue to step 554; otherwise, the flow may continue to step 560.

At step 554, an alert may be generated comprising an indication that a protection function of the IED and the supervision of method 500 are in conflict. Step 554 may comprise transmitting the alert via a communication interface, displaying the alert on a human-machine-interface, or the like. At step 560, the flow may terminate until a next set of stimulus inputs are received at step 520.

Reference throughout this specification to "some embodiments" or an "embodiment" means that a particular feature, structure, or characteristic described in connection with the embodiment is included in at least one embodiment. Thus, the appearance of the phrases "in one embodiment" or "in some embodiments" in various places throughout this specification are not necessarily all referring to the same embodiment. Furthermore, an "embodiment" may be a system, a device, an article of manufacture, a method, and/or a process.

The phrases "connected to," "networked," and "in communication with" "communicatively coupled to" refer to any form of interaction between two or more entities, including mechanical, electrical, magnetic, and electromagnetic interactions. Two components may be connected to each other even though they are not in direct physical contact with each other and even though there may be intermediary devices between the two components.

Some of the infrastructure that can be used with embodiments disclosed herein is already available, such as: general-purpose processors, programming tools and techniques, non-transitory, computer- and/or machine-readable storage media, and communications networks and interfaces. A computing device, such as an IED and/or monitoring device, may include a processor, such as a microprocessor, microcontroller, logic circuitry, or the like. The processor may include a special purpose processing device such as an ASIC, PAL, PLA, PLD, FPGA, or other processing means. The computing device may also include a computer-readable storage medium such as non-volatile memory, static RAM, dynamic RAM, ROM, CD-ROM, disk, tape, magnetic, optical, flash memory, or other non-transitory machine-readable storage medium.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A monitoring device to supervise an intelligent electronic device (IED) comprising an input module and protection logic for providing a protection function using a stimulus input from an electrical power system, the device comprising:
   a monitoring input module to receive the stimulus input; and
   a processor to detect a disturbance in the electrical power system using the stimulus input and to supervise the protection function of the IED based on the disturbance detection, wherein the processor detects disturbances in the electrical power system independently of the IED protection logic.

2. The monitoring device of claim 1, wherein the processor is disposed within a housing of the IED, and wherein the processor is isolated from the protection logic of the IED.

3. The monitoring device of claim 1, wherein the monitoring device opens an operating window responsive to detecting a disturbance in the electrical power system, and supervises the IED by inhibiting a trip output of the IED outside of the operating window.

4. The monitoring device of claim 1, the IED comprising output logic to generate a trip output, the device further comprising an electrical connection to the output logic to supervise the trip output.

5. The monitoring device of claim 1, the input module comprising a measurement device to measure the stimulus input independently of the IED input module.

6. The monitoring device of claim 1, the monitoring input module comprising a measurement device to measure two or more stimulus inputs and to combine the two or more stimulus inputs into a composite value, the processor to detect a disturbance in the electrical power system using the composite value.

7. The monitoring device of claim 1, the monitoring input module comprising a filter and an analog-to-digital converter to process the stimulus input for the processor independently of the IED input module.

8. The monitoring device of claim 1, the processor to calculate a delta of the stimulus input, and to detect a disturbance in the electrical power system when the delta exceeds a threshold.

9. The monitoring device of claim 1, the processor to calculate a delta of a composite value comprising two or more stimulus inputs, determine an adaptive threshold using the delta, and to detect a disturbance in the electrical power system when the delta exceeds the adaptive threshold.

10. The monitoring device of claim 1, further comprising a self-test module configured to prevent supervision of the IED when a monitoring device failure is detected.

11. A method for supervising an intelligent electronic device (IED) comprising protection logic to provide a protection function using stimulus inputs from an electrical power system, the method comprising:
   receiving stimulus inputs from the electrical power system at a monitoring device;
   combining two or more of the stimulus inputs into a composite value, the composite value configured to be non-zero under normal operating conditions in the electrical power system;
   calculating a delta of the composite value;
   detecting a disturbance in the electrical power system when the delta exceeds a threshold, wherein the disturbance is detected by the monitoring device independently of the protection logic of the IED; and
   supervising the protection function of the IED based on the disturbance detection.

12. The method of claim 11, further comprising combining each phase of a three-phase stimulus input into the composite value.

13. The method of claim 11, wherein detecting a disturbance comprises,
   calculating an adaptive threshold by approximating a noise level in the stimulus inputs; and
   detecting a disturbance in the electrical power system when the delta exceeds a product of the adaptive threshold and a constant scaling factor.

14. The method of claim 11, further comprising:
   opening an operating window when a disturbance in the electrical power system is detected; and
   suppressing a trip output of the IED outside of the operating window.

15. The method of claim 14, wherein the trip output of the IED is suppressed using an electrical coupling between the monitoring device and the trip output.

16. The method of claim 14, wherein the supervision of the protection function is user-configurable.

17. The method of claim 14, wherein the operating window remains open for one of a predetermined time period, a predetermined number of measurement cycles, and a predetermined number of monitoring cycles.

18. The method of claim 14, further comprising generating an alert responsive to detecting a trip output of the IED outside of the operating window.

19. A system for supervising an intelligent electronic device (IED), the IED comprising protection logic to perform a protection function using stimulus inputs from the electrical power system, the system comprising:
   a monitoring device comprising,
   an input module to receive stimulus inputs from the electrical power system and to combine the stimulus inputs into a composite value such that the composite value is non-zero during normal operating conditions in the electrical power system, and
   supervision logic to calculate a delta of the composite value, to determine an adaptive threshold corresponding to a noise level in the stimulus inputs, and to open an operating window when the delta exceeds the adaptive threshold, the supervision logic being isolated from the protection logic of the IED,
   wherein the monitoring device suppresses the protection function outside of the operating window.

20. The system of claim 19, the input module comprising a filter and analog-to-digital converter to process the stimulus inputs for the supervision logic independently of an input module of the IED.

21. The system of claim 19, the monitoring device to suppress the protection function using an electrical connection to a trip output of the IED.

* * * * *